United States Patent
Maranz

(10) Patent No.: US 9,113,653 B2
(45) Date of Patent: Aug. 25, 2015

(54) METHODS OF ADMINISTERING PROBIOTIC ORGANISMS THAT SYNTHESIZE CAROTENOID COMPOUNDS IN SITU TO ENHANCE HUMAN HEALTH AND NUTRITION

(76) Inventor: Steven J Maranz, Christiansburg, VA (US)

( * ) Notice: Subject to any disclaimer, the term of this patent is extended or adjusted under 35 U.S.C. 154(b) by 30 days.

(21) Appl. No.: 13/589,260

(22) Filed: Aug. 20, 2012

(65) Prior Publication Data

US 2013/0316041 A1 Nov. 28, 2013

Related U.S. Application Data

(60) Provisional application No. 61/575,336, filed on Aug. 19, 2011.

(51) Int. Cl.
*A23L 1/30* (2006.01)

(52) U.S. Cl.
CPC ........... *A23L 1/3014* (2013.01); *A23V 2002/00* (2013.01)

(58) Field of Classification Search
CPC .............................. A23L 1/3014; A23L 1/302
USPC .................. 426/72; 424/59, 442; 435/41, 147
See application file for complete search history.

(56) References Cited

U.S. PATENT DOCUMENTS

| | | | |
|---|---|---|---|
| 4,439,629 A | 3/1984 | Ruegg | |
| 5,466,599 A | 11/1995 | Jacobson et al. | |
| 5,591,343 A | 1/1997 | Kitaoka | |
| 6,060,050 A | 5/2000 | Brown et al. | |
| 6,753,022 B1 * | 6/2004 | Vermin et al. | 426/43 |
| 6,783,951 B2 | 8/2004 | Long et al. | |
| 6,929,928 B2 | 8/2005 | Cheng et al. | |
| 7,064,196 B2 | 6/2006 | Cheng et al. | |
| 7,070,952 B2 | 7/2006 | Cheng et al. | |
| 7,202,067 B2 | 4/2007 | Weaver et al. | |
| 7,582,451 B2 | 9/2009 | Weaver et al. | |
| 7,585,659 B2 | 9/2009 | Weaver et al. | |
| 7,998,519 B2 | 8/2011 | Gutknecht | |
| 8,071,086 B2 | 12/2011 | Dennin et al. | |
| 8,097,281 B2 | 1/2012 | Heim et al. | |
| 8,101,170 B2 | 1/2012 | Plail et al. | |
| 8,124,070 B2 | 2/2012 | Zink | |
| 8,168,171 B2 | 5/2012 | Mogna | |
| 8,187,590 B2 | 5/2012 | Farmer | |
| 8,192,978 B2 | 6/2012 | Kaesler | |
| 2004/0067223 A1 * | 4/2004 | Jacob et al. | 424/93.48 |
| 2005/0069505 A1 * | 3/2005 | Breton et al. | 424/59 |
| 2005/0255147 A1 * | 11/2005 | Geach | 424/442 |
| 2006/0188955 A1 * | 8/2006 | Stephanopoulos et al. | 435/67 |
| 2007/0207187 A1 * | 9/2007 | Yajima et al. | 424/439 |
| 2007/0294129 A1 * | 12/2007 | Froseth et al. | 705/10 |
| 2009/0105341 A1 * | 4/2009 | Stanton | 514/560 |
| 2009/0176287 A1 * | 7/2009 | Schmidt-Dannert et al. | 435/147 |
| 2009/0253174 A1 * | 10/2009 | Serber et al. | 435/69.1 |

OTHER PUBLICATIONS

NPL "Gram Staining" retrieved from internet on Nov. 25, 2013.*
NPL Frengova et al. Applied Biochemistry and Biotechnology, 112: 133-141, 2004.*
NPL Pro-vitamin A (Wikipedia) retrieved on Nov. 14, 2014.*
Cunningham et al., A portfolio of plasmids for identification and analysis of carotenoid pathway enzymes: Adonis aestivalis as a case study, 92 Photosynth. Res. 245-59 (2007).
Das et al., An update on microbial carotenoid production: application of recent metabolic engineering tools, 77 Appl. Microbiol. Biotechnol. 505-12 (2007).
Frengova et al., Carotenoids from *Rhodotorula* and PhaYa: yeasts of biotechnological importance, 36 J. Ind. Microbiol. Biotechnol. 163-80 (2009).
Frengova et al., Improvement of carotenoid-synthesizing yeast *Rhodotorula rubra* by chemical mutagenesis, 59 Z. Naturforsch C. 99-103 (2004).
Frengova et al., Use of whey ultrafiltrate as a substrate for production of carotenoids by the yeast *Rhodotorula rubra*, 112 Appl. Biochem. Biotechnol. 133-41 (2004).
Garrido-Fernandez et al., Carotenoid production in *Lactobacillus plantarum*, Int. J. Food Microbiol. 34-39 (2010).
Johnson et al., Microbial carotenoids, 53 Adv. Biochem. Engin. 19-178 (1995).
Li et al., Profiling of carotenoids in six microalgae (Eustigmatophyceae) and assessment of their β-carotene productions in bubble column photobioreactor, 34(11) Biotechnol. Lett. 2049-53 (2012).
Lin et al., Genetic manipulation of *Xanthophyliomyces dendrorhous* and *Phaffia rhodozyma*, 898 Methods Mol. Biol. 235-49 (2012).

(Continued)

*Primary Examiner* — Michele L Jacobson
*Assistant Examiner* — Bhaskar Mukhopadhyay

(57) ABSTRACT

A method is disclosed for increasing systemic carotenoid levels in humans through oral consumption of tablets, capsules, food or beverage products containing microbial organisms capable of synthesizing carotenoid compounds. Carotenoid synthesis may occur in situ by microbial organisms colonizing the gut, or in food or beverage products where carotenoids accumulate and are subsequently consumed dietarily. The microbial organisms may be either transgenic—thus expressing genes in the carotenoid synthesis pathway derived from other microbial organisms, or they may comprise species or strains selected for natural synthesis of carotenoids. The central objective of the invention is to provide an improvement in human health through a novel method for supplying and delivering carotenoid compounds.

15 Claims, No Drawings

(56) References Cited

OTHER PUBLICATIONS

Maranz et al., Pro-Vitamin A Biosynthesis by Gut Microbiota, Gates Foundation Grand Challenges Exploration Round 7 (available at http://www.grandchallenges.org/explorations/Pages/grantsawarded.aspx? Round=all&Phase=all&ProjectID=755) (accessed Jul. 23, 2014).

Moline et al., Production of torularhodin, torulene, and β-carotene by *Rhodotorula* yeasts, 898 Methods Mol. Biol. 275-83 (2012).

Sanders et al., The Scientific Basis of *Lactobacillus acidophilus* NCFM Functionality as a Probiotic, 84 J. Dairy Sci. 319-31 (2001).

Schmidt-Dannert, Engineering novel carotenoids in microorganisms, 11 Current Opinion Biotechnol. 255-61 (2000).

Sears, A dynamic partnership: celebrating our gut microflora, 11 Anaerobe 247-51 (2005).

Takaichi, Carotenoids in Algae: Distributions, Biosyntheses and Functions, 9 Marine Drugs 1101-18 (2011).

Yu et al., Identification and characterization of lactic acid bacteria isolated from traditional pickles in Sichuan, China., 58 J. Gen. Appl. Microbial. 163-72 (2012).

Zago et al., Characterization and probiotic potential of *Lactobacillus plantarum* strains isolated from cheeses, 28 Food Microbiol. 1033-40 (2011).

\* cited by examiner

METHODS OF ADMINISTERING PROBIOTIC ORGANISMS THAT SYNTHESIZE CAROTENOID COMPOUNDS IN SITU TO ENHANCE HUMAN HEALTH AND NUTRITION

CROSS-REFERENCE TO RELATED APPLICATIONS

This application claims the benefit of priority to U.S. Provisional Patent Application No. 61/575,336, filed Aug. 19, 2011.

BACKGROUND OF THE INVENTION

1. Field of the Invention

Carotenoids play a vital role in human health and nutrition. Physiological functions of carotenoids include a critical role in stem cell differentiation and concomitant growth and development. Carotenoids also play a substantial role in eye physiology, both in photo transduction and in helping to protect the retina from damage due to actinic light (for example, UV radiation). Carotenoids naturally accumulate in the macula lutea, the central region of the retina that contains the highest concentration of cone cells, which are responsible for high resolution vision. Other physiological functions include a vital immune system role through T and B cell differentiation and proliferation in response to pathogens. Carotenoids can also be efficient free radical scavengers and contribute to the oxidative stability of membranes and tissues.

Despite the importance of carotenoids in human health, mammalian cells do not synthesize most of these compounds. Mammals require dietary precursors for in vivo synthesis of key regulatory carotenoids such as retinoids. Hence, carotenoids must be present in the diet for proper health to be maintained.

Carotenoids are terpenoid compounds that are naturally synthesized in plants, microalgae, cyanobacteria, and well as some fungi and bacteria. Carotenoids can include xanthophylls, the molecules of which contain oxygen (for example, lutein and zeaxanthin) and carotenes, which are unoxygenated molecules such as α-carotene, β-carotene and lycopene.

Many different dietary carotenoids play a significant health role, among them the α-, β-, and γ-carotenes and β-cryptoxanthin, which can be converted to vitamin A in mammals. Vitamin A plays an essential role in photoreceptor function, in which light is converted to electrical signals. Since vitamin A levels depend upon an adequate intake of dietary carotenoids, poor diet can result in vitamin A deficiency with an accompanying suite of adverse health consequences.

In developing nations, particularly in sub-Saharan Africa, vitamin A deficiency can result in night blindness, and in severe cases, complete blindness. Up to half a million children in the developing world go blind each year from vitamin A deficiency, which is followed by death within a year for about half the children. Night blindness is also common in pregnant and nursing women who are vitamin A deficient. Vitamin A deficiency also correlates with a higher incidence of malaria, higher fatalities from infectious diseases, and growth stunting in infants and children. Since vitamin A levels derive from dietary intake of carotenoid compounds, there is a compelling need to improve the quantity, quality and availability of carotenoids in diet.

Although animals do not synthesize carotenoids, some microbial species have carotenoid synthesis pathways. Carotenoid synthesis genes have also been successfully transferred into microbial species that do not naturally produce the compounds. Microbial production of carotenoids, whether natural or transgenic, can be efficient enough to be used in industrial production. Many commercial facilities around the world culture microaglae microalgae for the purpose of harvesting carotenoids.

While the capacity of microbes to commercially produce carotenoids as bulk chemicals has been explored, with an extensive number of patents granted, the potential for using gut microbiota to synthesize carotenoids in situ as dietary inputs has not been grasped until very recently. While the intestinal bacterium *Escherichia coli* has been experimentally transformed with plasmid vectors carrying genes coding for carotenoids, in most cases, *E. coli* was used simply as a laboratory model to ascertain gene function and to study the biochemical pathways involved in compound synthesis, including the MVA and MEP pathways. The use of carotenoid-producing *Escherichia* strains to correct nutritional deficiencies or to boost systemic carotenoid or vitamin A levels has not been patented, as far as the investigator has been able to determine. This also holds true for other gut microbiota, such as lactic acid bacteria, as well for free-living carotenoid synthesizing microbes which might be adapted for probiotic use.

Lactic acid bacteria have an ancient history of safe human use in foods and food products, being the active microbial agents in the making of dairy products such as yogurts and cheeses, as well as numerous vegetable fermentations, such as sauerkraut, kimchi, olives and pickled cucumbers. Lactic acid bacteria carry the US-FDA designation of "generally regarded as safe," or GRAS. Lactic acid bacteria ingested in fermented foods or in capsule form can colonize the digestive tract, often resulting in improvement in digestive function, alleviation of diarrhea and other intestinal ailments and inflammations, improved immune function and may also contribute to the inhibition of some cancers. Because of the important health role played by lactic acid bacteria and other beneficial gut microbiota such as bifidobacteria, as well as certain yeasts and non-lactic acid bacteria, including *E. coli*, they are collectively known as "probiotics." The UN Food and Agriculture Organization defines probiotics as "Live microorganisms which when administered in adequate amounts confer a health benefit on the host."

Probiotics therefore constitute an excellent platform for synthesis and delivery of carotenoids, with the goal of boosting systemic carotenoid levels in the host and alleviating vitamin A deficiencies. This can be achieved either by selection of microbial strains naturally synthesizing carotenoids, or employing transgenic probiotic organisms that synthesize carotenes using genetic material taken from other microbes, or genetic material originally isolated from plants or other sources. In this conception, carotenoid-synthesizing probiotics can be delivered in the form of capsules containing live organisms, or in cultured foods such yogurts, cheeses and soy products, or in wine or beer or fermented cereals. The boost in carotenoid levels in the host can come from two sources: either the in situ synthesis of the compounds by probiotic organisms' colonizing the host's digestive tract which have been selected or transformed for carotenoid synthesis, or by accumulation of carotenoids in a food product, such as yogurt or cheese. The overall health benefits accruing to the host are multiple: the beneficial action of the organisms themselves in the host digestive system, the in situ synthesis of carotenoid compounds by these microbes, and the higher carotenoid content of the ingested food products.

2. Description of Prior Art

Inventions claiming use of carotenoid biosynthesis by microbes have almost exclusively focused on production of extractable chemicals for food, feed and pharmaceutical use as an end goal (Li et al. 2012; Das et al. 2007; Johnson & Shroeder, 1995; U.S. Pat. Nos. 4,439,629; 5,466,599; 5,591, 343; 6,783,951). There is an extensive body of literature describing the genes coding for carotenoid synthases and the genetic pathways involved (Takaichi, 2011; Cunningham & Gantt, 2007; Schmidt-Dannert. 2000). Consequently, there are many patents for genes coding for particular steps in carotenoid synthesis pathways, which often claim novelty based on the biological source of the gene (U.S. Pat. Nos. 6,929,928; 7,064,196; 7,070,952; 7,202,067; 7,582,451; 7,585,659).

There is also an extensive body of literature on probiotic organisms and the health benefits accruing from consumption of these organisms (Sears, 2005; Sanders & Klaenhammer, 2001). Numerous patents exist defining a particular strain of probiotic organism along with its particular physiological or bioactive effects (U.S. Pat. Nos. 8,071,086; 8,168,171; 8,187, 590; 8,192,978). Similarly, the use of particular strains and blends of different strains or species has been the subject of many patents (U.S. Pat. Nos. 6,060,050; 8,101,170; 8,124, 070). The use of live microbes in food products or dietary supplements that also contain vitamins as separately added components has also been patented (U.S. Pat. No. 8,097,281). A U.S. patent has been granted for probiotic Bifodobacterium strains specifically selected for folic acid production, with intended human use (U.S. Pat. No. 8,168,171).

Foods and beverages using fermentative microorganisms have been known since antiquity. Many processes for producing yogurts, cheeses, sauerkraut, pickles, beers, wines and numerous other products have been published or patented. Some of the microorganisms traditionally used in fermentations naturally synthesize carotenoids, such as *Lactobacillus plantarum*, although carotenoid production is seldom taken into account or even mentioned in descriptions of the microbial species present (Yu et al. 2012). A study of the probiotic potential of 98 strains of *L. plantarum* isolated from cheeses did not cite carotenoid production at all (Zago et al. 2011). Nevertheless, the genetic alteration of *L. plantarum* to convert the native C30 carotenoids into C40 carotenoids with known benefit to humans was been proposed; but with the object of industrial production of carotenoids (Garrido-Fernandez, 2010). Similarly, yeasts naturally synthesizing carotenoids occur widely in nature and have also been modified to produce high yields of useful carotenoids, again with the goal of commercial carotenoid production (Lin et al. 2012; Moline et al. 2012; Frengova & Beshkova, 2009). Techniques for the culture of *Rhodotorula* yeasts on dairy whey ultrafiltrate, either alone or in combination with symbiotic bacteria, have been developed, but with the goal of industrial production (Frengova et al. 2004).

The use of live microbes specifically to produce or accumulate carotenoids in food or beverage products or in vivo in the human digestive tract for human health purposes has not been the subject of a patent, insofar as the inventor is aware. The first formal publication of this concept was an announcement by the Gates Foundation in November, 2011, awarding Grand Challenges Explorations grants to two projects seeking to alleviate vitamin A deficiency in developing nations via probiotic carotenoid synthesis (Gates Foundation GCE Round 7). The inventor of the present invention; who was a recipient of the above grant, filed a provisional patent application prior to the award announcement date. The full presentation of the invention is given below.

SUMMARY OF THE INVENTION

An object of this invention is to boost systemic levels of carotenoid compounds by oral consumption of live organisms that synthesize carotenoid compounds, with the goal of improving human nutrition and health. A specific object of the invention is to address vitamin A deficiency caused by insufficient levels of pro-vitamin A carotenoids in the diet by harnessing the potential of pro biotic organisms to synthesize these carotenoids.

This is achieved by ingestion of organisms that have been transformed with genetic material obtained from other microorganisms or from plants or animal DNA, thus conferring the ability to synthesize carotenoid compounds-including the necessary precursors and any physiologically active downstream metabolic products—where such synthesis was lacking in the native form of the organism. Alternatively, organisms that naturally synthesize carotenoids can be selected, hybridized, or environmentally adapted for the specific purpose of enhancing carotenoid and vitamin A levels in humans, with the goal of improving the health of the consumer. The use of certain probiotic organisms that naturally synthesize carotenoids has the inherent advantage of already being classified as safe for human consumption by regulatory agencies. The use of carotenoid synthesizing organisms that are not normally part of human food ways also constitute a potentially viable natural source of carotenoids. The use of transgenic probiotic organisms has a higher potential ceiling, owing to a broader range of carotenoid compounds that can be synthesized, accompanied by improved efficiencies of synthesis, although the regulatory barriers for food use can be expected to be greater. This invention therefore applies both to organisms that naturally synthesize carotenoids and those that have been genetically modified to do so.

A specific object of the invention is to cause the colonization of the human digestive tract by organisms that are able to synthesize carotenoids in situ, thus delivering key nutrients and pro-health compounds directly to the human host. Another object of the invention is to provide increased intake of dietary carotenoids via oral consumption of fermented food and beverage products that have accumulated higher levels of carotenoids due to the presence of probiotic organisms synthesizing these compounds. Thus, the boost in systemic carotenoid levels in the host can come from either in situ synthesis of carotenoids by introduced microbiota that successfully colonize the digestive tract, or by consumption of high levels of carotenoids in food and beverage products due to the synthesis and accumulation of these compounds in the products themselves.

The invention is carried out by ingestion of organisms either in the form of tablets or capsules containing live organisms capable of synthesizing carotenoids, or by consumption of food and beverage products containing these organisms.

DESCRIPTION OF SPECIFIC EMBODIMENTS

The present invention arises from ongoing research addressing severe vitamin A deficiency in the developing world, as well as the need for better nutrition and health in populations in developed countries.

The invention builds on the modern development of technologies for genetically modifying organisms, in which exogenous genetic material is introduced by various means into a microbe, which is then able to express the transgene(s) and synthesize one or more compounds that are otherwise not naturally produced by the recipient organism. This invention claims a novel application for transgene technology, wherein the transformed organisms are gut micro biota made to express genes coding for carotenoids. The carotenoids may consist of xanthophylls and carotenes, and may include apocarotenoids, nor- and seco-carotenoids, retro-carotenoids and retro-apo-carotenoids, so called "higher carotenoids" such as bacterioruberin, and retinoids. Also included are glycoside forms, as well as esters, aldehydes and epoxides, along with upstream precursor compounds necessary for synthesis and the downstream metabolic products needed or useful for maintaining or improving the health of the human host.

The critical dietary compounds are thus delivered in situ in the host's gut by carotenoid-producing organisms. Alternatively or additionally, dietary carotenoids are provided via oral ingestion of food and beverage products which have accumulated carotenoids during the fermentation, culturing or preparation process, due to the presence of microorganisms synthesizing these compounds.

This invention further includes the use of organisms that are naturally able to synthesize carotenoids. Both genetically modified organisms and species that naturally synthesize carotenoids are delivered in the form of tablets or capsules or in foods such as fermented dairy or soy products, including yogurts and cheeses, as well other fruit, vegetable and grain products prepared with microbes. The invention may also include beverages prepared with microbial fermentation, such as beer, wine, mead, kombucha and tibicos, or other beverages containing live carotenoid synthesizing microbes. Carotenoid synthesizing microbes can include either bacteria or yeasts alone or in combination, including symbiotic combinations of bacteria and yeast (SCOBYs). The invention may also employ carotenoid synthesizing organisms that do not usually colonize mammalian digestive tracts but may be adapted for this purpose. Oral consumption of these products results in increased systemic levels of carotenoids and vitamin A, with the object of providing a significant improvement in the health of the human consumer.

A method for increasing carotenoid levels and carotenoid function in humans by ingestion of live microbial organisms (e.g., probiotic organisms), comprising of administering: (i) microbial organisms that have been genetically modified to synthesize carotenoid compounds and/or compounds that enhance the bioavailability and efficacy of carotenoids, or (ii) microbial organisms that naturally synthesize carotenoid compounds or enhance carotenoid bioavailability and efficacy.

The probiotic organisms may include *Escherichia* strains (e.g., *E. coli*). The probiotic organisms may comprise lactic acid bacteria. The lactic acid bacteria may comprise, but are not limited to, the following genera: *Lactobacillus, Leuconostoc, Bifidobacterium, Pediococcus, Lactococcus, Streptocaccus, Aerococcus, Carnobacterium, Enterococcus, Oenococcus, Sporolactobacillus, Tetragenococcus, Vagococcus,* and *Weisella*.

The microbial organisms may comprise, but are not limited to, gram positive bacteria. The microbial organisms may comprise, but are not limited to, gram negative bacteria. The microbial organisms used may be species that are commonly found in or inhabit mammalian digestive tracts. The microbial organisms used may be species that do not normally live in the mammalian digestive tract, but nevertheless confer a health benefit to a human host when consumed. The microbial organisms may comprise, but are not limited to, bacteria, yeasts, protists, extremophiles, thermophiles, psychrophiles, cyanobacteria, archaea, microalgae, green sulfur bacteria, green non-sulfur bacteria and purple bacteria. The microbial organisms can be selected, mutated, hybridized or otherwise modified to colonize the mammalian digestive tract or to produce carotenoids in live culture food or beverage products. The species or strain employed maybe used alone or in combination with any number of other species or strains.

The microbial organisms can comprise a mixture of organisms that may include noncarotenoid synthesizing organisms that enhance or complement the health functions of the carotenoid synthesizing species in the mix. The microbial organisms may comprise yeasts or fungi, including but not limited to, the genera *Saccharomyces, Schizosaccharomyces, Brettanomyces, Candida, Dekkera, Aspergillus, Monascus, Kluyveromyces, Phaffia, Rhodotorula, Torulaspora* and *Xanthophyllomyces*.

The carotenoid compounds may comprise, but are not limited to, xanthophylls, carotenes, apocarotenoids and retinoids, with or without their glycosides and esters, as well as other conjugated forms, including complex molecules such as proteins, polysaccharides and oligomers. The xanthophyll compounds may comprise, but are not restricted to, astaxanthin, canthaxanthin, cryptoxanthin, lutein, neoxanthin, violaxanthin and zeaxanthin.

The carotenoid compounds may comprise, but are not restricted to, pro-vitamin A compounds. The pro-vitamin A compounds may consist of α-carotene, β-carotene, γ-carotene and/or β-cryptoxanthin, including their glycosides and other conjugated forms that can be converted to vitamin A. The carotenoids can include compounds with no known vitamin A activity, but are nevertheless beneficial to human health. The apocarotenoid compounds may consist of, but are not restricted to, bixin, 13-bixin, norbixin, cochloxanthin, dihydrocochloxanthin, peridinin, apocarotenal and abscisic acid. The retinoid compounds include but are not restricted to, retinal, retinoic acid, retinol, retinal as well as their fatty acid esters and other conjugated forms. The carotenoid compounds may consist of, but are not restricted to, C40 tetraterpenoids.

The compounds synthesized by the probiotic organisms can include the necessary precursors for biosynthesis of bioactive carotenoids. The carotenoid compounds can include downstream compounds synthesized from any given carotenoid, including metabolic and catabolic products thereof. The compounds synthesized can include downstream metabolic products conducive to the health-enhancing object of the invention.

The carotenoids produced are coded for by genes of prokaryotic or eukaryotic origin that may derive from any suitable bacterial, viral, fungal, algal, protist, plant, animal, synthetic or DNA bearing source. The genes derived from one or more different sources can be used alone or combination. The genes derived from one source may modify the activity or the products of genes from other sources, including, but not limited to, conversion of compounds of microbial or plant origin by genes of animal origin into compounds that are physiologically active within the human body.

The genes coding for synthesis of compounds that aid the uptake, bioavailability and efficacy of carotenoids by the host may be used in the invention. The carotenoid compounds may consist of, but are not restricted to, lipids that enhance the uptake of carotenoids from the digestive tract and thereby increase serum carotenoid levels. The carotenoid synthesis genes and other genes coding for compounds enhancing the health benefit of the invention may occur naturally in the organism or may be transferred into the organism by genetic modification.

The carotenoid synthesis pathways employed can include, but are not restricted to, the mevalonate (MVA) pathway and the 2-C-methyl-D-erythritol 4-phosphate (MEP) pathway. The genes coding for the carotenoid synthesis may include, but are not restricted to, geranyl-eranyl pyrophosphate synthase (crtE), phytoene synthase (crt B), phytoene desaturase (crtI), β-cyclase (crtY), zeaxanthin synthase (crtZ), zeaxanthin β-glucosidase (crtX).

The carotenoid production is boosted by regulatory genes or genes for supplementary pathways that may be limiting in the principal pathway, including, but not restricted to, Or genes, isopentenyl diphosphate isomerase (IPI) and 1-deoxy-D-xylulose 5-phosphate synthase (DXS).

The carotenoid synthesis genes can be arranged in any order conducive to the central objective of this invention: namely, to enhance human health by synthesis of beneficial carotenoid compounds. The carotenoid synthesis pathway genes are used in one or more plasmid vector constructs. The plasmid contains components necessary or beneficial for the successful synthesis of carotenoid compounds, including but not restricted to, one or more promoters, one or more selectable markers, one or more multiple cloning sites, one or more restriction enzyme sites and/or one or more polyadenylation sites in addition to genes for the carotenoid synthesis pathways.

Any commonly used microbiological genetic transformation techniques can be used to introduce genes into gut microbiota for the purpose of increasing carotenoid levels in humans, including, but not restricted to, conjugation, transfer of natural plasmids and genomic DNA, protoplast fusion, shuttle vectors, bacteriophages, lambda red recombination, recombineering, gene guns, liposomes, trans-membrane carriers, osmotic gradients, electroporation, phagemid, cosmid, baculovirus, bacmid, bacterial, yeast and viral vectors. Any suitable means of genetically modifying microorganisms with the object of enhancing carotenoid production, bioavailability or efficacy is employed.

The organisms are administered in tablet or capsule forms, which are understood in this claim to also include features common to the prior art that are necessary or useful in the administration of the organisms. The organisms are administered in food or beverage products.

The organisms can be used to culture dairy products, which may consists of, but are not limited to yogurt, labneh, kefir and cheeses, such that the carotenoid content is enhanced compared to said products prepared in the usual or traditional manner, or typical of the prior art.

The organisms can be used to culture soy products, which may consists of, but are not limited to, soy milk, soy yogurt and soy cheeses, such that the carotenoid content is enhanced compared to said products prepared in the usual or traditional manner, or typical of the prior art.

The organisms may be used in the fermentation process of beer, wine or mead making, or added to the beverage after fermentation, in order to enhance the carotenoid content of the beverages, such that the carotenoid content is enhanced compared to said beverages prepared in the usual or traditional manner, or typical of the prior art.

The beers, wines or meads may be used specifically as probiotic products in which carotenoid producing organisms are employed primarily for human health benefits.

The carotenoid producing organisms may be used secondarily as an improvement or enhancement, thus giving added benefit to existing or traditional alcoholic beverage formulations.

The organisms are used to prepare non-alcoholic or mildly alcoholic beverages, such as tibicos, kombucha, kvass or kefir, such that the carotenoid content is enhanced compared to said beverages prepared in the usual or traditional manner, or typical of the prior art.

The organisms may be used as one or more components in a product employing a symbiotic combination of bacteria and yeast (SCOBY).

The probiotic organisms producing carotenoids are used to ferment vegetable or plant products, including raw and cooked seeds, pods, fruits, buds, flowers, leaves, stems, roots and tubers, as well as extracts of these plant parts and preparations derived from them.

The organisms can be used to ferment, coat or otherwise imbue post-harvest cereal grains or pulses with microbe-derived carotenoids, such that the carotenoid content of the food product is enhanced compared to said food product prepared in the usual or traditional manner, or typical of the prior art.

The beneficial health effects of the tablet or capsule containing organisms producing carotenoids derives from synthesis of the said compounds in situ within the host digestive tract following colonization of the gut by the said organisms after consumption of the tablet or capsule.

The beneficial health effects of the food or beverage product containing organisms producing carotenoids derive from either the carotenoids accumulating in the product or from synthesis of the said compounds in situ within the host digestive tract following colonization of the gut by the said organisms after consumption of the product.

The organisms used in the production of food and beverage products are also employed for the purpose of changing or modifying the flavor or taste of the product.

The health enhancing activity of the organisms may comprise, but is not limited to, alleviating vitamin A deficiency, improving nutrition, growth and development, vision and eye health, antioxidant status, immune responses, as well as combating cancer and infectious diseases and maintaining overall wellness, or any combination of two or more of these benefits.

The organisms can be used in combination with vaccines to increase the efficacy of the vaccine.

The genes and plasmids expressing one or more luciferases and/or green or red fluorescent proteins may be inserted into gut microbiota to facilitate studies in which the survival, persistence and relevant population parameters are tracked in humans or laboratory animals.

I claim:

1. A method comprising orally administering, to a human, at least one live microbial organism that has been genetically modified to make a transgenic probiotic microorganism to synthesize bacterioruberin, whereby:
   (a) The modified microorganism colonizes the human gut and synthesizes bacterioruberin in situ.
   (b) The modified microorganism comprises one or more species selected from:
      (i) the lactic acid producing group consisting of *Lactobacillus, Leuconostoc, Pediococcus, Lactococcus, Streptococcus, Aerococcus, Enterococcus, Oenococcus, Sporolactobacillus, Tetragenococcus, Vagococcus*, and *Weissella*, and/or
      (ii) the genus *Bifidobacterium*, and/or
      (iii) human gut colonizing microorganisms of the domain Archaea.

2. The method of claim 1, further comprising microorganism species from the yeast genera *Saccharomyces, Schizosaccharomyces, Brettanomyces, Candida, Dekkera, Kluyveromyces* and *Rhodotorula*.

3. The method of claim 1, wherein the microorganism producing bacterioruberin is further modified with genes for synthesis of additional carotenoids.

4. The method of claim 3, wherein the additional carotenoids comprise retinal or pro-vitamin A carotenoids, or both.

5. The method of claim 1, wherein one or more microbial strains synthesizing carotenoids may be co-administered with the microorganism synthesizing bacterioruberin.

6. The method of claim 5, wherein the carotenoids comprise pro-vitamin A carotenoids.

7. The method of claim 1, wherein one or more microorganisms lacking carotenoid synthesis may be co-administered with the microorganism synthesizing bacterioruberin.

8. The method of claim 1, wherein bacterioruberin and/or other carotenoid compounds produced by the microorganisms include their isomers, hydrate/anhydrate forms, glycosides, esters, other conjugated forms and metabolites.

9. The method of claim 5, further comprising administering lipids that enhance the uptake of the carotenoid compounds from the digestive tract.

10. The method of claim 1, wherein the microorganisms are modified using one or more plasmid vector constructs.

11. The method of claim 1, wherein the microorganisms are modified using one or more natural plasmids.

12. The method of claim 1, wherein the probiotic microorganisms are orally administered in tablet or capsule form.

13. The method of claim 1, wherein the microbial organisms are provided in a food or beverage product.

14. The method of claim 13, wherein the food or beverage further comprises yeast.

15. The method of claim 13, wherein the food or beverage product accumulates compounds produced by the modified microorganisms.

* * * * *